United States Patent
Ramamurthy et al.

(10) Patent No.: US 9,642,159 B1
(45) Date of Patent: May 2, 2017

(54) USE OF INDICATION IN DOWNLINK CONTROL INFORMATION MESSAGING TO SIGNAL PRESENCE OF ADDITIONAL DOWNLINK CONTROL INFORMATION MESSAGING

(71) Applicant: Sprint Spectrum L.P., Overland Park, KS (US)

(72) Inventors: Suryanarayanan Ramamurthy, Olathe, KS (US); Jatinder Judge, Orlando, FL (US); Jasinder P. Singh, Olathe, KS (US); Jean-Emile Nguepi, Pingree Grove, IL (US)

(73) Assignee: Sprint Spectrum L.P., Overland Park, KS (US)

( * ) Notice: Subject to any disclaimer, the term of this patent is extended or adjusted under 35 U.S.C. 154(b) by 196 days.

(21) Appl. No.: 14/329,000

(22) Filed: Jul. 11, 2014

(51) Int. Cl.
*H04W 72/12* (2009.01)
*H04W 72/04* (2009.01)
*H04L 5/00* (2006.01)

(52) U.S. Cl.
CPC ... *H04W 72/1289* (2013.01); *H04W 72/0406* (2013.01); *H04L 5/0092* (2013.01)

(58) Field of Classification Search
CPC ... H04L 5/0092; H04L 5/0007; H04L 1/0073; H04L 5/0048; H04L 5/0035; H04W 72/0406; H04W 72/042; H04W 72/08; H04W 72/1289
See application file for complete search history.

(56) References Cited

U.S. PATENT DOCUMENTS

| | | | |
|---|---|---|---|
| 2010/0254268 A1 | 10/2010 | Kim et al. | |
| 2011/0243066 A1* | 10/2011 | Nayeb Nazar | H04L 1/007 370/328 |
| 2012/0078933 A1* | 3/2012 | Kim | H04L 5/0007 707/758 |
| 2013/0163543 A1* | 6/2013 | Freda | H04W 72/0406 370/329 |
| 2013/0163551 A1* | 6/2013 | He | H04W 4/06 370/329 |

(Continued)

OTHER PUBLICATIONS

First Action Interview Pilot Program Pre-Interview Communication from U.S. Appl. No. 14/476,316, dated Mar. 23, 2016.

(Continued)

*Primary Examiner* — Habte Mered
*Assistant Examiner* — Prince A Mensah

(57) ABSTRACT

Disclosed is a method and apparatus to help facilitate providing of multiple Downlink Control Information (DCI) messages that separately schedule downlink communication of bearer data to a wireless communication device (WCD) in a given sub-frame, to help ensure receipt of such multiple DCI messages by the WCD. As disclosed, a base station will include in at least one such DCI message an indication that there is in the sub-frame at least one other such DCI message. When the WCD receives and reads the one such DCI message, the WCD may thereby learn from the indication that there is at least one other such DCI message in the sub-frame. The WCD may then search for and find the at least other such DCI message in the sub-frame and/or may use the indication as a basis to verify receipt of all such DCI messages in the sub-frame.

17 Claims, 8 Drawing Sheets

(56) References Cited

U.S. PATENT DOCUMENTS

2014/0233663 A1    8/2014   Kang et al.
2015/0296455 A1   10/2015   Yamazaki et al.

OTHER PUBLICATIONS

A. Roessler, M. Kottkamp, "LTE-Advanced (3GPP Rel. 11) Technology Introduction White Paper," (2013).
FAI Office Action from U.S Appl. No. 14/476,316, dated May 16, 2016.

* cited by examiner

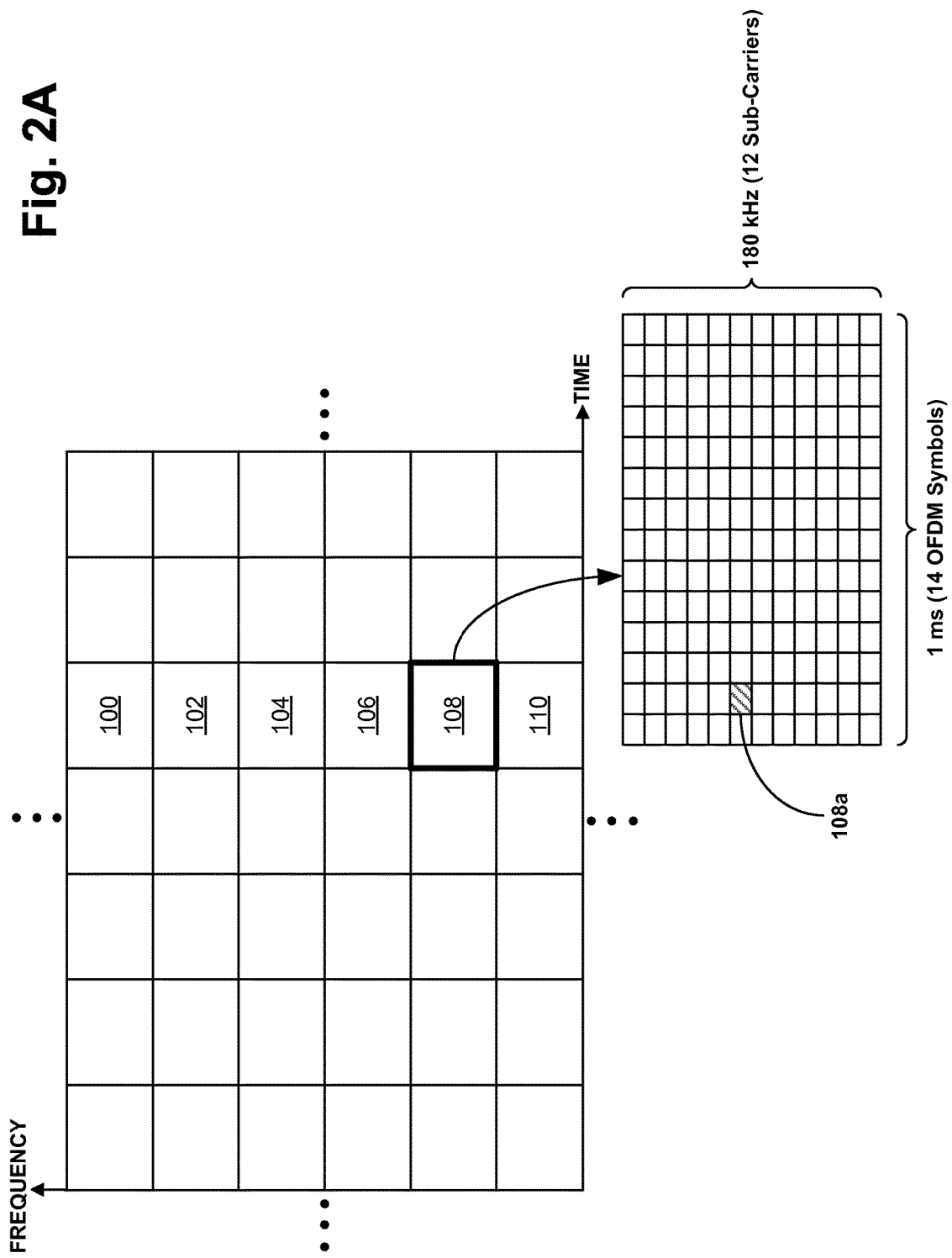

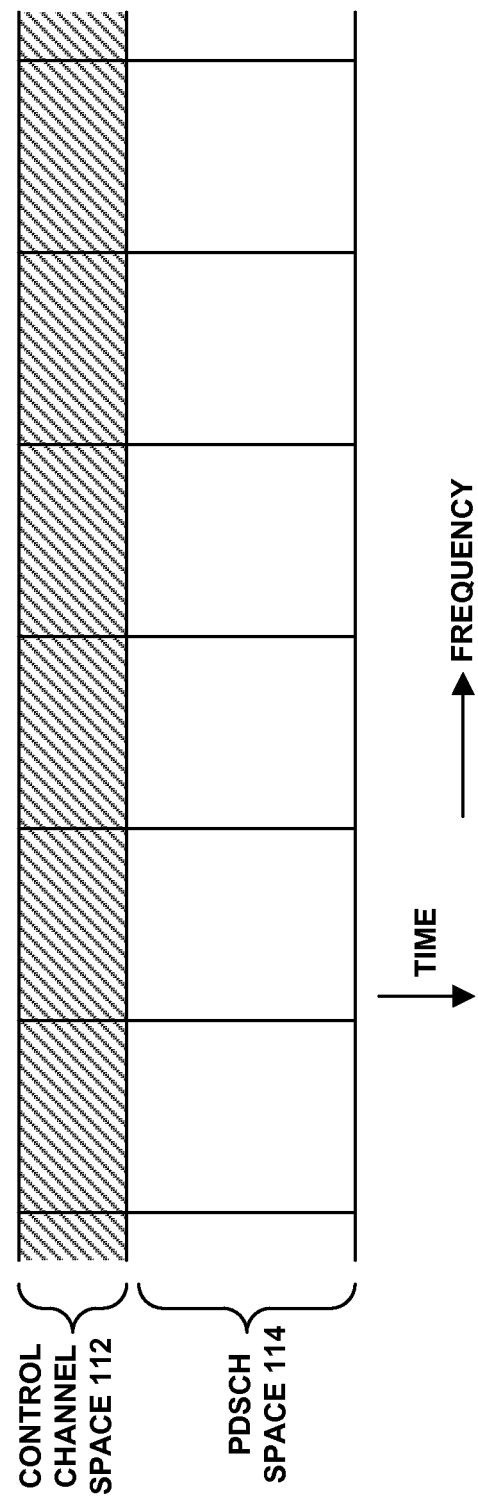

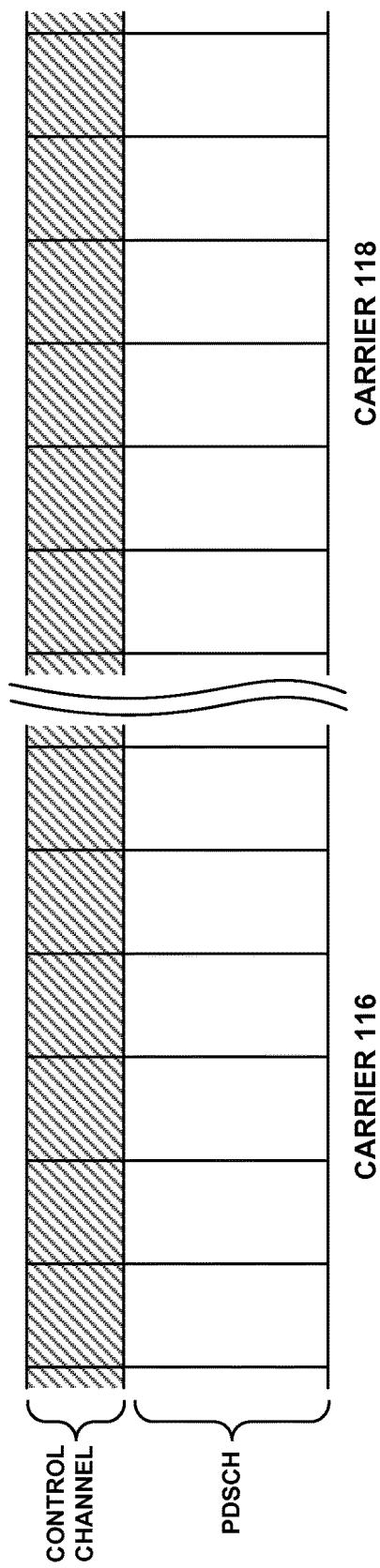

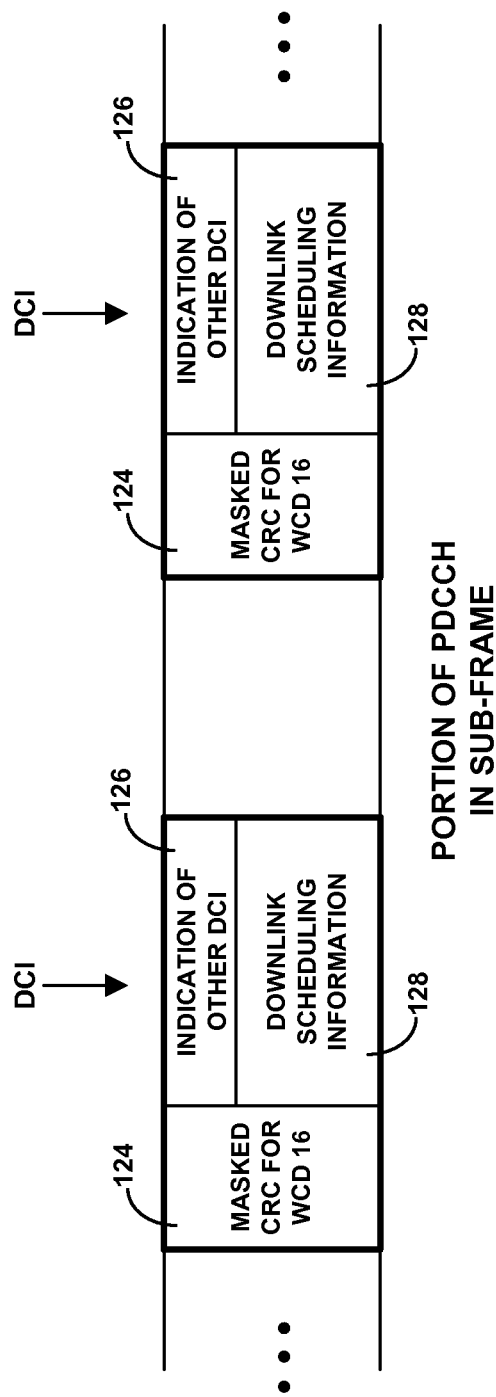

USE OF INDICATION IN DOWNLINK CONTROL INFORMATION MESSAGING TO SIGNAL PRESENCE OF ADDITIONAL DOWNLINK CONTROL INFORMATION MESSAGING

BACKGROUND

Unless otherwise indicated herein, the materials described in this section are not prior art to the claims and are not admitted to be prior art by inclusion in this section.

In a wireless communication system, a base station may provide one or more coverage areas, such as cells or sectors, in which the base station may serve wireless communication devices (WCDs), such as cell phones, wirelessly-equipped personal computers or tablets, tracking devices, embedded wireless communication modules, or other devices equipped with wireless communication functionality. In general, each coverage area may operate on one or more carriers each defining a respective bandwidth of coverage, and each coverage area may define an air interface providing a downlink for carrying communications from the base station to WCDs and an uplink for carrying communications from WCDs to the base station. The downlink and uplink may operate on separate carriers or may be time division multiplexed over the same carrier(s). Further, the air interface may define various channels for carrying communications between the base station and WCDs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station may operate on one or more carriers spanning 3 MHz, 5 MHz, 10 MHz, 15 MHz, or 20 MHz. On each such carrier used for downlink communications, the air interface then defines a Physical Downlink Shared Channel (PDSCH) as a primary channel for carrying data from the base station to WCDs, and a Physical Downlink Control Channel (PDCCH) for carrying control signaling from the base station to WCDs. Further, on each such carrier used for uplink communications, the air interface defines a Physical Uplink Shared Channel (PUSCH) as a primary channel for carrying data from WCDs to the base station, and a Physical Uplink Control Channel (PUCCH) for carrying control signaling from WCDs to the base station.

In LTE, downlink air interface resources are mapped in the time domain and in the frequency domain. In the time domain, LTE defines 10 millisecond (ms) frames, 1 ms sub-frames and 0.5 ms slots. Thus, each frame has 10 sub-frames, and each sub-frame has 2 slots. In the frequency domain, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), to form one OFDM symbol.

LTE further defines a particular grouping of time-domain and frequency-domain resources as a downlink resource block. In the time domain, each downlink resource block has a duration corresponding to one sub-frame (1 ms). In the frequency domain, each downlink resource block consists of a group of 12 sub-carriers that are used together to form OFDM symbols. Typically, the 1 ms duration of a downlink resource block accommodates 14 OFDM symbols, each spanning 66.7 microseconds, with a 4.69 microsecond guard band (cyclic prefix) added to help avoid inter-symbol interference. Depending on the bandwidth of the downlink carrier, the air interface may support transmission on a number of such downlink resource blocks in each sub-frame. For instance, a 5 MHz carrier supports 25 resource blocks in each 1 sub-frame, whereas a 15 MHz carrier supports 75 resource blocks in each 1 sub-frame.

The smallest unit of downlink resources is the resource element. Each resource element corresponds to one sub-carrier and one OFDM symbol. Thus, a resource block that consists of 12 sub-carriers and 14 OFDM symbols has 168 resource elements. Further, each OFDM symbol and thus each resource element can represent a number of bits, with the number of bits depending on how the data is modulated. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits.

Within a resource block, different resource elements can have different functions. In particular, a certain number of the resource elements (e.g., 8 resource elements) may be reserved for reference signals used for channel estimation. In addition, a certain number of the resource elements (e.g., resource elements in the first one, two, or three OFDM symbols) may be reserved for the PDCCH and other control channels. In each sub-frame, the resource elements that define these control channels cooperatively span the entire bandwidth, leaving most of the remaining resource elements in each resource block for use to define the PDSCH.

One of the main functions of the PDCCH is to carry "Downlink Control Information" (DCI) messages to served WCDs. LTE defines various types or "formats" of DCI messages, to be used for different purposes, such as to indicate how a WCD should receive data in the PDSCH of the same sub-frame, or how the WCD should transmit data on the PUSCH in an upcoming sub-frame. For instance, a DCI message in a particular sub-frame may schedule downlink communication of bearer data to a WCD, by specifying one or more particular resource blocks that carry the bearer data in the sub-frame's PDSCH, what modulation scheme is used for the downlink transmission, and so forth.

Each DCI message may span a particular set of resource elements on the PDCCH (e.g., one, two, three, or four control channel elements (CCEs), each including 36 resource elements) and may include a cyclic redundancy check (CRC) that is masked (scrambled) with an identifier (e.g., cell radio network temporary identifier (C-RNTI)) assigned to the WCD, so that the WCD can identify and read the DCI message. In practice, a WCD may monitor the PDCCH in each sub-frame in search of a DCI message destined to the WCD. In particular, the WCD may engage in a "blind decoding" process in which the WCD reads various candidate groups of resource elements on the PDCCH in search of a DCI message masked with the WCD's identifier. If the WCD finds such a DCI message, the WCD may then read that DCI message and proceed as indicated. For instance, if the DCI message schedules downlink communication of bearer data to the WCD on particular PDSCH resources in the current sub-frame, the WCD may then read the indicated PDSCH resources to receive that bearer data.

LTE also supports uplink control signaling on the PUCCH using "Uplink Control Information" (UCI) messages. UCI messages can carry scheduling requests from WCDs, requesting the base station to allocate PPUSCH resources for uplink bearer data communication. Further, UCI messages can carry Hybrid Automatic Repeat Request (HARQ)

messages from WCDs to the base station, to inform the base station whether downlink data transmissions were successful or not, and to facilitate re-transmission when appropriate. In practice, when the base station schedules downlink communication of bearer data to a WCD on particular PDSCH resources, the WCD may seek to read the data from the indicated resources. If the WCD successfully receives the data, the WCD may then responsively transmit to the base station a UCI message providing an HARQ "ACK" to inform the base station that the WCD successfully received the data. Whereas, if the WCD does not successfully receive the data, the WCD may responsively transmit to the base station an HARQ "NACK," to inform the base station that the downlink transmission was unsuccessful and to trigger re-transmission by base station.

In a system arranged as above, when a WCD enters into coverage of a base station, the WCD may engage in attach signaling with the base station, by which the WCD would register to be served by the base station on a particular carrier (perhaps a particular pair of downlink carrier and uplink carrier). Through the attach process and/or subsequently, the base station and supporting LTE network infrastructure may establish for the WCD one or more bearers, essentially defining logical tunnels for carrying bearer data between the WCD and a transport network such as the Internet. Each such bearer may have a particular class of service defined by a quality of service class identifier (QCI), for carrying a particular class or type of data. For instance, one such bearer may be a best-efforts bearer for carrying general Internet traffic, another such bearer may be an Internet Multimedia System (IMS) signaling bearer for carrying voice over Internet Protocol (VoIP) setup signaling, and another such bearer may be a guaranteed-bit-rate bearer for carrying VoIP traffic.

Once attached with the base station, a WCD may then operate in a "connected" mode in which the base station may schedule data communication to and from the WCD on the WCD's established bearer(s). In particular, when the base station receives bearer data for transmission to the WCD, the base station may schedule particular PDSCH resources to carry that bearer data and may provide a DCI message to the WCD directing the WCD to receive the bearer data on those PDSCH resources. Similarly, when the WCD has bearer data to transmit to the base station, the WCD may transmit a scheduling request to the base station, and the base station may then schedule particular PUSCH resources to carry that bearer data and provide a DCI message to the WCD directing the WCD to transmit the bearer data on those PUSCH resources.

In a basic LTE arrangement, when a WCD is attached with a base station on a particular carrier (e.g., pair of downlink carrier and uplink carrier), the base station provides DCIs to the WCD on the PDCCH of that carrier and schedules downlink communication of bearer data to the WCD on the PDSCH of that carrier. As a base station may be serving many WCDs at a time, however, the PDSCH on such a carrier may become congested. To help overcome this issue, a revision of LTE known as LTE-Advanced now permits a base station to serve a WCD with "carrier aggregation," by which the base station schedules bearer communication with the WCD on multiple carriers at a time. With carrier aggregation, a base station may provide a DCI message to a WCD on the carrier on which the WCD is attached (the WCD's "primary carrier" or "PCell"), but may use that DCI message to schedule downlink communication of bearer data to the WCD on two or more carriers at time, such as on both the PDSCH of the WCD's primary carrier and the PDSCH of one or more other carriers (the WCD's "secondary carriers" or "SCells"). Such carrier aggregation can significantly increase the base station's effective bandwidth, well beyond the 20 MHz limit.

OVERVIEW

In a system as described above, it may be useful for a base station to be able to transmit multiple DCI messages to a WCD in a single sub-frame, with each DCI message separately scheduling downlink communication of bearer data to the WCD. Such an arrangement may be useful where one DCI message schedules downlink communication of bearer data to the WCD without carrier aggregation (e.g., on just the PDSCH of the carrier on which the WCD is attached), and where another DCI message schedules downlink communication of bearer data to the WCD with carrier aggregation (e.g., on both the PDSCH of the carrier on which the WCD is attached and one or more other carriers). Alternatively or additionally, such an arrangement may be useful where one DCI message schedules downlink communication of bearer data for one of multiple bearers (e.g., a bearer having a particular QCI), and where another DCI message schedules downlink communication of bearer data for another bearer (e.g., a bearer having another QCI).

As noted above, a WCD may engage in a blind decoding process in each sub-frame in search of a DCI message destined to the WCD. Through that process, the WCD may find in the sub-frame a DCI messages that schedules downlink communication of bearer data to the WCD, and the WCD may then receive the bearer data from the indicated PDSCH resources. Further, assuming the WCD successfully receives the bearer data, the WCD may then send a HARQ ACK to the base station.

If the base station were to transmit to the WCD in the sub-frame two or more DCI messages that each schedule downlink communication of bearer data to the WCD, there is a chance that the WCD would not receive all of those DCI messages and might therefore not receive all of the indicated bearer data. For instance, once the WCD finds in the sub-frame one such DCI message scheduling downlink transmission of bearer data to the WCD, the WCD may discontinue its search in the sub-frame for any other such DCI messages and therefore not receive each other DCI message scheduling downlink transmission of bearer data to the WCD. Alternatively, even if the WCD searches for all candidate DCI messages on the PDCCH, interference or other issues may result in one or more of the multiple DCI messages scheduling downlink communication of bearer data to the WCD not making it successfully to the WCD.

Unfortunately, in such a scenario, the WCD may receive one or more but less than all of the DCI messages that the base station transmitted to the WCD in the sub-frame to schedule downlink communication of bearer data to the WCD, and the WCD may be unaware of the existence of the one or more other such DCI messages that the base station transmitted to the WCD in the sub-frame. Consequently, the WCD may successfully receive the bearer data on the PDSCH as indicated by the DCI message(s) that the WCD received in the sub-frame, and the WCD may transmit an HARQ ACK to the base station, indicating successful receipt of the bearer data communicated from the base station to the WCD. However, that HARQ message may be incorrect, as it may not reflect the fact that the WCD did not receive the bearer data communicated by the base station in accordance with the non-received DCI message. As a result, the base station may not re-transmit the non-received bearer data to the WCD, and so the WCD may never receive that bearer data, which may create a user-experience issue. Consequently, an improvement is desired.

Disclosed herein is a method and apparatus to help facilitate providing of multiple DCI messages that separately schedule downlink communication of bearer data to a WCD in a given sub-frame, and particularly to help ensure receipt of such multiple DCI messages by the WCD. In accordance with the disclosure, the base station will include in at least one such DCI message an indication that there is in the sub-frame at least one other such DCI message. Thus, when the WCD receives and reads the one such DCI message, the WCD may thereby learn from the indication that there is at least one other such DCI message in the sub-frame. Consequently, the WCD may then search for and find the at least one other such DCI message in the sub-frame. Or the WCD may use the indication as a basis to verify that the WCD received each such DCI message in the sub-frame.

In one implementation, for instance, the base station may provide two such DCI messages to the WCD in a sub-frame, and each of those DCI messages may include an indication of presence in the sub-frame of the other such DCI message. Given such an indication, the WCD may then verify that it receives both such DCI messages in the sub-frame, perhaps responding to the indication in one by searching for and finding the other. If the WCD receives both such DCI messages in the sub-frame and successfully receives the bearer data that the DCI messages schedule on the PDSCH, then the WCD may safely send an HARQ ACK to the base station. Whereas, if the WCD receives only one of those DCI messages in the sub-frame, then, even if the WCD successfully receives the bearer data that that DCI message schedules on the PDSCH, the WCD may send an HARQ NACK to the base station, on grounds that the WCD would learn from the indication that there was another such DCI message that the WCD did not receive and therefore that there was at least some other bearer data that the WCD did not receive.

In another implementation, the base station may provide in each such DCI message to the WCD in the sub-frame an indication (e.g., count) of how many other such DCI messages to the WCD there are in the sub-frame. Given such an indication, the WCD may then similarly verify that it receives all of such DCI messages in the sub-frame, again perhaps responding to the indication in one by searching for and finding each other. And here too, if the WCD receives all such DCI messages in the sub-frame and successfully receives the bearer data that the DCI messages schedule on the PDSCH, then the WCD may safely send an HARQ ACK to the base station. Whereas, if the WCD receives less than all of those DCI messages in the sub-frame, then, even if the WCD successfully receives the bearer data that the received DCI message(s) schedule on the PDSCH, the WCD may send an HARQ NACK to the base station, on grounds that the WCD would learn from the indication that there was at least one other such DCI message that the WCD did not receive and therefore that there was at least some other bearer data that the WCD did not receive.

Accordingly, in one respect, disclosed is a method operable by a cellular base station, such as an LTE base station (e.g., evolved Node B (eNodeB)) for instance. In accordance with the method, the cellular base station provides a wireless coverage area that defines an air interface, with the air interface defining downlink sub-frames each having a downlink control channel and each having a downlink traffic channel, and the cellular base station transmits, in the downlink control channel of a given one of the sub-frames, DCI messages that schedule downlink communication of bearer data. Further, the cellular base station transmits in the downlink control channel of the given sub-frame at least two such DCI messages to a particular WCD served by the cellular base station, and the cellular base station includes in at least one of the at least two transmitted DCI messages an indication of presence, in the downlink control channel of the given sub-frame, of at least one other DCI message of the at least two DCI messages.

As noted above, the indication included in at least one of the at least two transmitted DCI messages may thereby enable the WCD to ensure that the WCD receives all of the at least two DCIs transmitted to the WCD in the given sub-frame, such as by causing the WCD to search for one or more such DCI messages that the WCD has not yet received, and/or by allowing the WCD to confirm that it received all such DCI messages as a condition to the WCD then sending an HARQ ACK for successfully received bearer data.

In another respect, disclosed is a method operable by a WCD, such as an LTE WCD (e.g., user equipment (UE)) for instance. In accordance with the method, the WCD operates in a wireless coverage area served by a cellular base station, with the wireless coverage area defining an air interface, and the air interface defining downlink sub-frames each having a downlink control channel and each having a downlink traffic channel. Further, the WCD wirelessly receives from the cellular base station, in the downlink control channel of a given one of the sub-frames, at least two DCI messages transmitted from the cellular base station to the WCD, with each of the at least two DCI messages scheduling downlink communication of bearer data to the WCD, and at least one DCI message of the at least two DCI message including an indication of presence, in the downlink control channel of the given sub-frame, of at least one other DCI message of the at least two DCI messages. Still further, the WCD uses the indication in at least one DCI message of the at least two DCI messages as a basis to ensure receipt by the WCD of all of the at least two DCI messages transmitted to the WCD in the given sub-frame, in the manner noted above for instance.

In yet another respect, disclosed is a WCD arranged to carry out a method such as that described above for instance. As disclosed, the WCD includes a wireless communication interface for engaging in communication with a base station over an air interface, where the air interface defines downlink sub-frames each having a downlink control channel and each having a downlink traffic channel. Further, the WCD includes a controller for processing communications that the wireless communication interface receives from the base station.

According to the disclosure, the controller detects in the downlink control channel of a given one of the sub-frames at least two DCI messages transmitted from the base station to the WCD, where of the at least two DCI messages schedules downlink communication of bearer data to the WCD in the downlink traffic channel of the given sub-frame, and at least one DCI message of the at least two DCI messages includes an indication of presence, in the downlink control channel of the given sub-frame, of at least one other DCI message of the at least two DCI messages. Further, the controller uses the indication in at least one DCI message of the at least two DCI messages as a basis to ensure receipt by the WCD of all of the at least two DCI messages transmitted to the WCD in the given sub-frame.

These as well as other aspects, advantages, and alternatives will become apparent to those of ordinary skill in the art by reading the following detailed description, with reference where appropriate to the accompanying drawings. Further, it should be understood that the descriptions pro-

BRIEF DESCRIPTION OF THE DRAWINGS

FIG. 2A is a conceptual illustration of a division of a shared downlink channel into downlink resource blocks, in accordance with an example embodiment.

FIG. 2C is a conceptual illustration of a segment of a downlink sub-frame on one carrier, depicting a relationship between downlink control channel and downlink traffic channel.

FIG. 2D is a conceptual illustration of a segment of a downlink sub-frame on two carriers, depicting a relationship between downlink control channels and downlink traffic channels.

FIG. 3 is a conceptual illustration of a portion of a PDCCH, depicting examples DCI messages each including indications of the presence of another DCI message.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
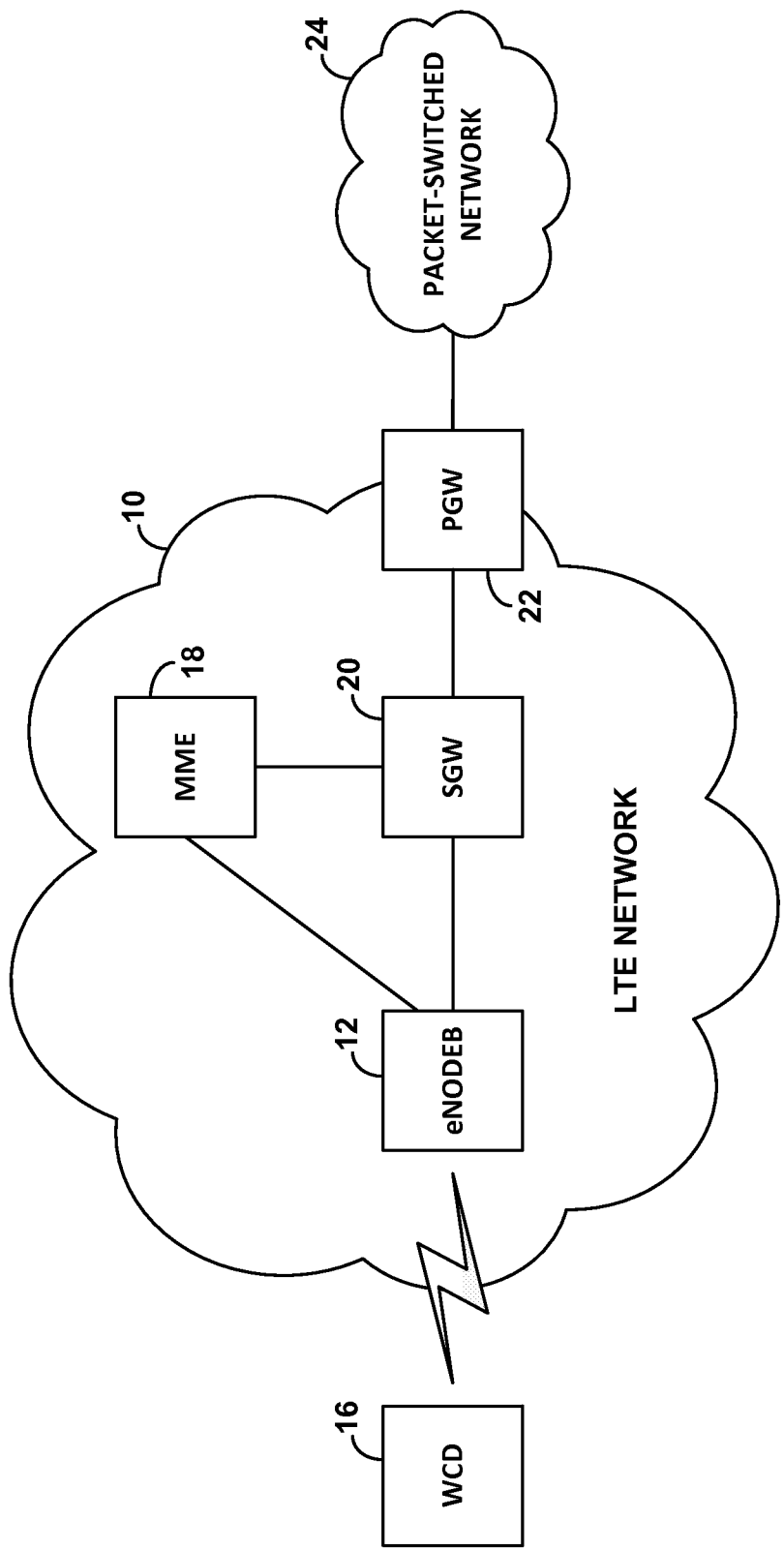
FIG. 1 is a simplified block diagram of a wireless communication system in which the present method and apparatus can be implemented.

Referring to the drawings, as noted above, FIG. 1 is a simplified block diagram of a wireless communication system in which the present method and apparatus can be implemented. In particular, FIG. 1 depicts a representative LTE network 10, which functions primarily to serve UEs with wireless packet data communication service, including possibly VoIP service, but may also provide other functions. As shown, the LTE network includes an eNodeB 12, which has an antenna structure and associated equipment for providing an LTE coverage area 14 in which to serve WCDs such as an example WCD 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be virtual interfaces through that network.

With this network arrangement as shown, WCD 16 may be attached with eNodeB 12 on a particular carrier and may have one or more established bearers for carrying bearer data between the WCD and packet-switched network 24. For instance, as noted above, the WCD may have a best-efforts bearer and an IMS signaling bearer, among possibly others. Each such bearer may extent between the WCD and the PGW 22, including a radio-bearer portion extending over the air between the WCD and the eNodeB, and an access bearer portion extending via the SGW 20 between eNodeB and the PGW 22.

In line with the discussion above, the eNodeB 12 may provide service on multiple carriers and may be equipped to serve WCDs with carrier aggregation using those multiple carriers. Further WCD 16 may be equipped to support carrier aggregation. For certain communications (e.g., for communication of bearer data on one or more particular bearers), the eNodeB may thus serve the WCD using carrier aggregation, whereas for other communications (e.g., for communication of bearer data on one or more other bearers), the eNodeB may serve the WCD without using carrier aggregation.

FIG. 2A illustrates how the downlink resources in a given wireless coverage area may be divided in time and frequency domains into resource blocks under LTE. In the time domain, each resource block occupies a 1 ms sub-frame. By way of example, FIG. 2A shows resource blocks 100-110 for a particular sub-frame. In the frequency domain, each of resource blocks 100-110 occupies a respective portion of frequency bandwidth, typically 180 kHz. Although FIG. 2A shows six resource blocks in each sub-frame, a wireless coverage area could have a greater number of resource blocks, as indicated by the dots above and below resource blocks 100-110. As noted above, for instance, in a 5 MHz LTE carrier, a total of 25 resource blocks may span each 1 ms sub-frame.

FIG. 2A also includes a more detailed view of downlink resource block 108. This detailed view shows that the 180 kHz of frequency bandwidth corresponds to 12 sub-carriers of 15 kHz each, and also shows that the 1 ms sub-frame corresponds to the duration of 14 OFDM symbols (although the number of OFDM symbols in a downlink resource block can vary). Each OFDM symbol spans the 12 sub-carriers and includes a respective sub-carrier symbol on each sub-carrier. Thus, as noted above, a downlink resource block may be described as a set of resource elements, with each resource element corresponding to a sub-carrier symbol that is carried on a particular sub-carrier for the duration of one OFDM symbol. The detailed view of downlink resource block 108 in FIG. 2A shows the division of the resource block into multiple resource elements, such as resource element 108a.

Figure 2B:
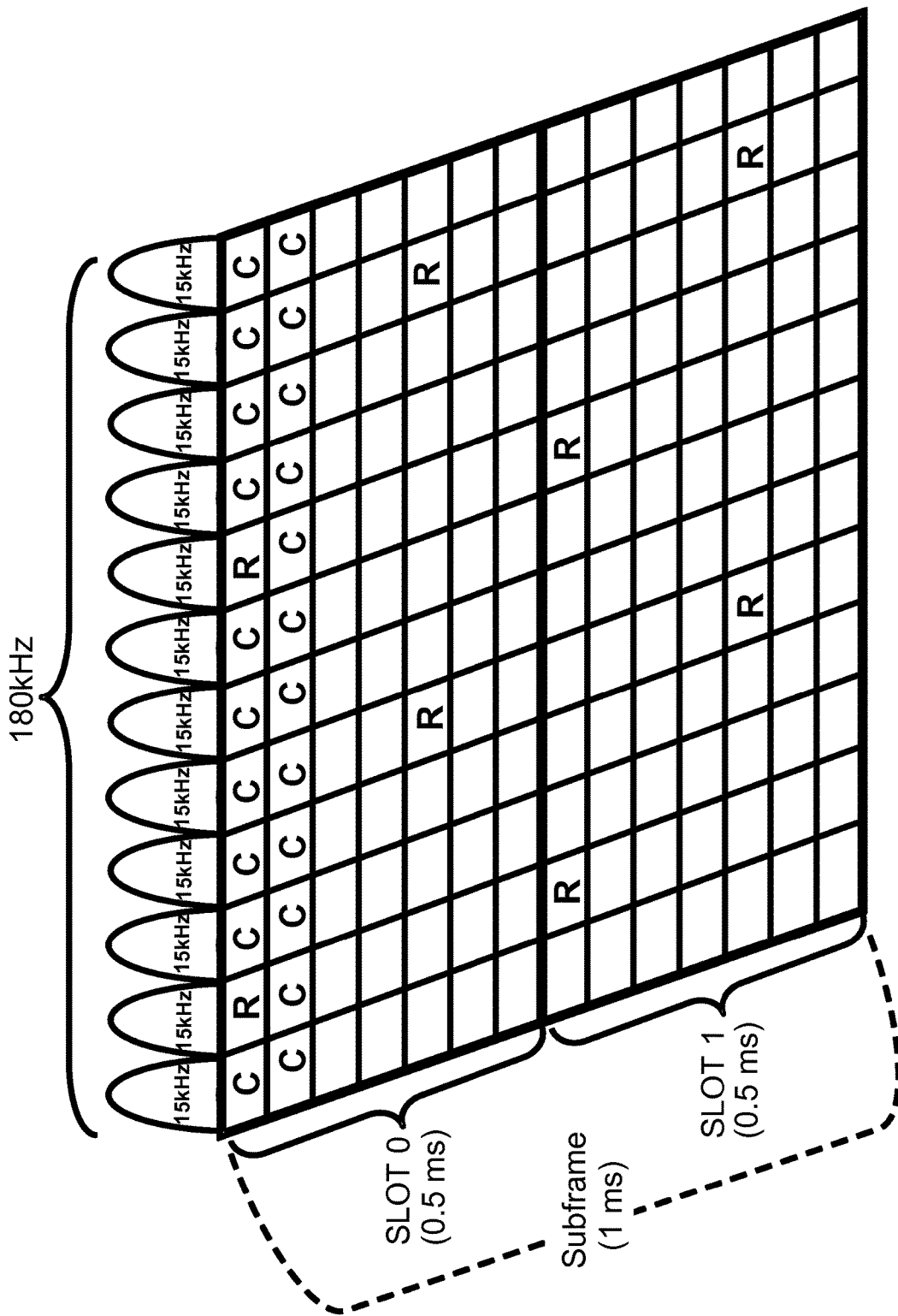
FIG. 2B is a conceptual illustration of a downlink resource block, in accordance with an example embodiment.

As further noted above, different resource elements in a downlink resource block may be used for different purposes. FIG. 2B illustrates different functions among the 168 resource elements in an example downlink resource block. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. It is to be understood that FIG. 2B illustrates only one possible configuration, and that a downlink resource block could have other configurations as well.

FIGS. 2C and 2D next depict a segment of an example downlink sub-frame, to help illustrate the example relationship between the PDCCH and PDSCH across the bandwidth of a representative carrier. In particular, FIG. 2C provides another view of the six example resource blocks 100-110 of FIG. 2A. As shown, a first portion of time (one or more OFDM symbol segments) of each resource block is reserved for use to define control channel space 112 that spans all of the resource blocks in the sub-frame. The remaining portion of each resource block (other than resource elements reserved for reference symbol use or the like) is then available for use to define PDSCH space 114. When a WCD is served on this carrier without carrier aggregation, the eNodeB may transmit DCI messages to the WCD in the PDCCH of control channel space 112, and those DCI messages may schedule downlink communication of bearer data to the WCD in the PDSCH space 114. Through blind decoding, the WCD may thus find and read those DCI messages and receive the bearer data from the indicated resources in PDSCH space 114.

FIG. 2D then illustrates a variation on this arrangement, depicting generally two example carriers 116, 118 (which may be contiguous or non-contiguous, and may be in the same band or different bands), with each band including control channel space and PDSCH space. With this arrangement, when a WCD is served on carrier 116 with carrier aggregation, the eNodeB may transmit DCI messages to the WCD in the PDCCH of carrier 116, and those DCI messages may schedule downlink communication of bearer data to the WCD in the PDSCHs of both carrier 116 and 118. Through blind decoding, the WCD may thus find and read those DCI messages and receive the bearer data from the indicated resources in those PDSCHs.

FIG. 3 next illustrates a portion of an example PDCCH, showing how the PDCCH in a given sub-frame may carry multiple DCI messages to a WCD, with each DCI message separately scheduling downlink communication of bearer data to the WCD, and with at least one of the DCI messages including an indication of the presence in the PDCCH of at least one other of the DCI messages. This figure illustrates two example DCI messages 120, 122 in the PDCCH, although the PDCCH could just as well carry more than two DCI messages to the WCD, each scheduling downlink communication of bearer data to the WCD. In the figure, each DCI message is shown including a first portion 124 carrying CRC masked with a C-RNTI of WCD 16, and a second portion carrying payload of the DCI message. The second portion of each DCI message may then carry payload of the DCI message and is shown including both (i) an indicator 126 of the presence, in the PDCCH of the sub-frame, of one or more other DCI messages for the WCD, and (ii) scheduling information 128 that schedules downlink communication of bearer data to the WCD.

With this example, the indicator 126 in each DCI message could take various forms. For example, if the PDCCH in the sub-frame carries just two such DCI messages for the WCD, the indicator in each DCI message could be a simple Boolean flag that the WCD would interpret as an indication that there is another such DCI message in the PDCCH, so that the WCD can ensure it receives that other DCI message as well. Further, in an arrangement where the WCD conducts blind decoding in a sequential manner, such as in order from low to high frequency, the first such DCI message that the WCD encounters may include such an indication to signal to the WCD that there is another such DCI message, so that the WCD will search for and find the other one as well, and the second such DCI message may or may not include any indication of the presence of the first such DCI message.

As another example, as long as the PDCCH in the sub-frame carries at least two such DCI messages, the indicator 126 in at least one, and possibly more than one, could be a specification (e.g., count) of how many such DCI messages there are in total for the WCD in the PDCCH of the sub-frame, so that the WCD can ensure that it receives that number of such DCI messages in the subframe, as a condition for sending a HARQ ACK upon successful receipt of the scheduled bearer data transmissions for instance. Other examples are possible as well.

In practice, the payload portion of each DCI message that schedules allocation of PDSCH resources to a WCD may carry a DCI format value that indicates the DCI message is a type that carries PDSCH resource allocation, and the message may then carry a specification of the PDSCH resource allocation. A DCI message that schedules PDSCH resources without carrier aggregation may simply specify the allocated PDSCH resources by denoting the PDSCH resource blocks as numbered resource blocks or ranges of resource blocks. Whereas, a DCI message that schedules PDSCH resources with carrier aggregation may specify for each allocation of resource blocks both the applicable carrier and the resource blocks being allocated on that carrier.

In accordance with the present method, the base station may include the indicator 126 in a particular field or place within the DCI message, and the WCD may be configured to read the indicator from that place in the DCI message, and to thereby determine from the indicator that there is at least one other DCI message for the WCD on the PDCCH of the sub-frame. Thus, the base station may include in the PDCCH of a sub-frame two or more DCI messages that schedule downlink communication of bearer data to the WCD, including such an indicator in at least one of those DCI messages, and the WCD may read and use at least that indicator as a basis to help ensure that the WCD receives all of the DCI messages.

Accordingly, aspects of the present method may be carried out by a cellular base station, such as eNodeB 12 shown in FIG. 1. In practice, such a cellular base station may provide a wireless coverage area defining an air interface, with the air interface defining downlink sub-frames each having a downlink control channel (e.g., PDCCH) and each having a downlink traffic channel (e.g., PDSCH). Further, the cellular base station may transmit, in the downlink control channel of a given one of the sub-frames, DCI messages that schedule downlink communication of bearer data.

In accordance with the method, the cellular base station may transmit in the downlink control channel of the of the given sub-frame at least two DCI messages to a particular WCD served by the base station, with each DCI message scheduling downlink communication of bearer data to the WCD. Further, the cellular base station may include, in at least one of the at least two transmitted DCI messages, an indication of presence, in the downlink control channel of the given sub-frame, of at least one other DCI message of the at least two DCI messages. In line with the discussion above, such an indication included in at least one of the at least two transmitted DCI messages may thus enable the WCD to ensure that the WCD receives all of the at least two DCIs transmitted to the WCD in the given sub-frame, such as (i) by signaling to the WCD that there is at least one additional such DCI message to receive and triggering the WCD to search for and find that DCI message, and/or (ii) by allowing the WCD to verify that it has received all of such DCI messages transmitted to it in the current sub-frame, perhaps as a condition precedent to the WCD sending a HARQ ACK for positive receipt of bearer data.

In practice, each such DCI message that the cellular base station transmits in the downlink control channel of the given sub-frame may schedule downlink communication of bearer data in the downlink traffic channel of the given sub-frame. Further, each of the at least two DCI messages may schedule downlink communication of different bearer data to the WCD than each other DCI message of the at least two DCI messages schedules, rather than being mere redundant copies of each other.

Moreover, as discussed above, the indication may take various forms. For instance, the at least two DCI messages may be two DCI messages, and the indication in the at least one DCI message of the two DCI messages may be a Boolean flag or other indication that indicates, and would thus be interpreted by the WCD as an indication of, presence, in the downlink control channel of the given sub-frame, of the other DCI message of the two DCI messages. Alternatively or additionally, the indication in the at least one DCI message may indicate how many other such DCI messages of the at least two DCI messages are present in the downlink control channel of the given sub-frame.

As further discussed above, each DCI message of the at least two DCI messages may include a CRC masked with a C-RNTI of the WCD. In addition, the cellular base station may use carrier aggregation to provide service on multiple carriers, and one of the at least two DCI messages may schedule downlink communication of bearer data to the WCD on just one of the multiple carriers, but another one of the at least two DCI messages may schedule downlink communication to the WCD on at least two carriers of the multiple carriers. Further, the cellular base station may provide the WCD with multiple distinct bearers for carrying bearer data, such as the bearers discussed above for instance, and each DCI message of the at least two DCI messages may schedule downlink communication to the WCD for a different respective one of the multiple distinct bearers. Moreover, one such DCI message may schedule downlink communication of bearer data for one of the distinct bearers on just the one carrier, whereas the another such DCI message may schedule downlink communication of bearer data for another of the distinct bearers on the at least two carriers.

Further, aspects of the present method may also be carried out by a WCD, such as WCD 16 shown in FIG. 1. Such a WCD may operate in a wireless coverage area served by a cellular base station, where the wireless coverage area defines an air interface, and the air interface defines downlink sub-frames each having a downlink control channel and each having a downlink traffic channel. In practice, the WCD in that arrangement may wirelessly receive from the cellular base station, in the downlink control channel of a given one of the sub-frames, at least two DCI messages transmitted from the cellular base station to the WCD, where each of the at least two DCI messages schedules downlink communication of bearer data to the WCD, and at least one DCI message of the at least two DCI message includes an indication of presence, in the downlink control channel of the given sub-frame, of at least one other DCI message of the at least two DCI messages. And the WCD may then use the indication in at least one DCI message of the at least two DCI messages as a basis to ensure receipt by the WCD of all of the at least two DCI messages transmitted to the WCD in the given sub-frame.

In line with the discussion above, the act of the WCD using the indication in the at least one DCI message of the at least two DCI messages as a basis to ensure receipt by the WCD of all of the at least two DCI messages transmitted to the WCD in the given sub-frame may take various forms. For example, it may involve (i) the WCD determining, based at least in part on the indication in the at least one DCI message of the at least two DCI messages (and perhaps further based on other evaluation), that there is at least another DCI message of the at least two DCI messages, and (ii) responsive to the determining, the WCD searching for and obtaining from the downlink control channel at least the other DCI message of the at least two DCI messages. And as another example, it may involve the WCD determining, based at least in part on the indication in the at least one DCI message of the at least two DCI messages, that the WCD has received all of the at least two DCI messages.

Further, as discussed above, the WCD may thus determine that the WCD has received all of the at least two DCI messages, and, based on at least in part on that determining (and perhaps further based on the WCD receiving the bearer data communicated pursuant to the at least two DCI messages), the WCD may transmit to the cellular base station a positive acknowledgement (e.g., HARQ ACK) indicating receipt by the WCD of the bearer data communicated pursuant to the at least two DCI messages.

Moreover, in line with the discussion above, the WCD may have at least two distinct bearers for communication of bearer data, and one of the at least two DCI messages may schedule downlink communication (e.g., on just one carrier) of bearer data for just one bearer of the at least two bearers, and another DCI message of the at least two DCI messages may schedule downlink communication (e.g., on two or more carriers) of bearer data for just another bearer of the at least two bearers.

Figure 4:
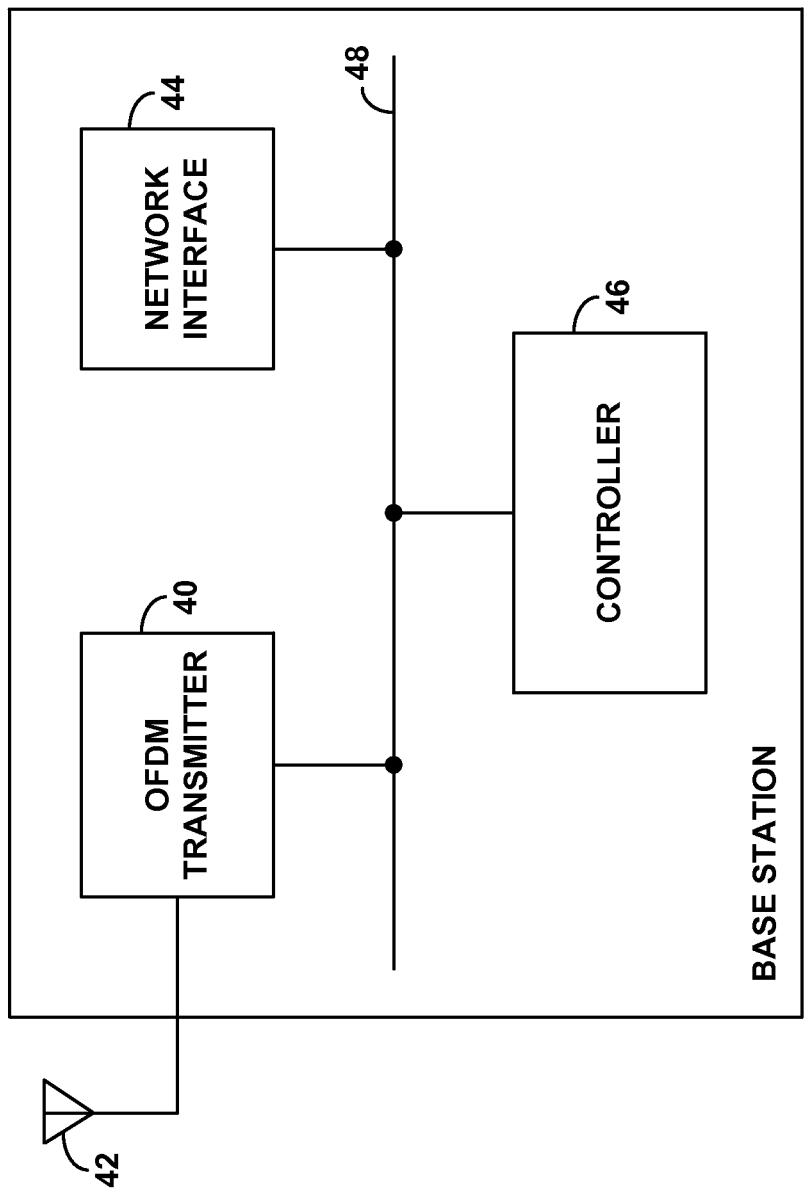
FIG. 4 is a simplified block diagram of an example cellular base station, in accordance with an example embodiment.

FIG. 4 is next a simplified block diagram of an example cellular base station, showing some of the components of such a base station to facilitate implementation of the present method. As shown in FIG. 4, the example base station includes an OFDM transmitter (transceiver) 40 and an associated antenna structure 42, as well as a network interface 44, and a controller 46, with various ones of these or other components being communicatively linked together by a system bus, network, or other connection mechanism 48.

OFDM transmitter 40 and antenna structure 42 may function in combination to provide an OFDMA air interface as described above. As such, the OFDM transmitter 40 is configured to receive data, generate OFDM symbols from the data, and transmit the OFDM symbols on the air interface, and to define on the air interface various channels such as a PDCCH and PDSCH as discussed above. Network interface 44 may then comprise a wired and/or wireless network communication interface (such as an Ethernet interface) through which the base station may receive data over a backhaul connection that connects the base station to one or more entities of a wireless network, such as an SGW as discussed above for instance, for transmission of the data to one or more WCDs served by the base station.

Controller 46, which may be integrated with OFDM transmitter 40 or one or more other components, may then control the transmission of data, including control and user data, on the downlink air interface. For example, controller 46 may allocate downlink resource blocks to WCDs and generate corresponding DCI messages, and controller 46 may control transmission by OFDM transmitter 40 accordingly. Further, controller 46 may cause OFDM transmitter to transmit to a WCD in a given sub-frame multiple DCI messages that schedule downlink communication of bearer data to the WCD, including in at least one such DCI message an indicator of presence, in the sub-frame, of at least one other such DCI message for the WCD.

Controller 46 could be implemented using hardware, software, and/or firmware. For example, controller 46 could include one or more processors and a non-transitory computer readable medium (e.g., volatile and/or non-volatile memory) that stores executable instructions. The executable instructions, when executed by the one or more processors, may cause controller 46 to perform any of the base station functions described herein.

Figure 5:
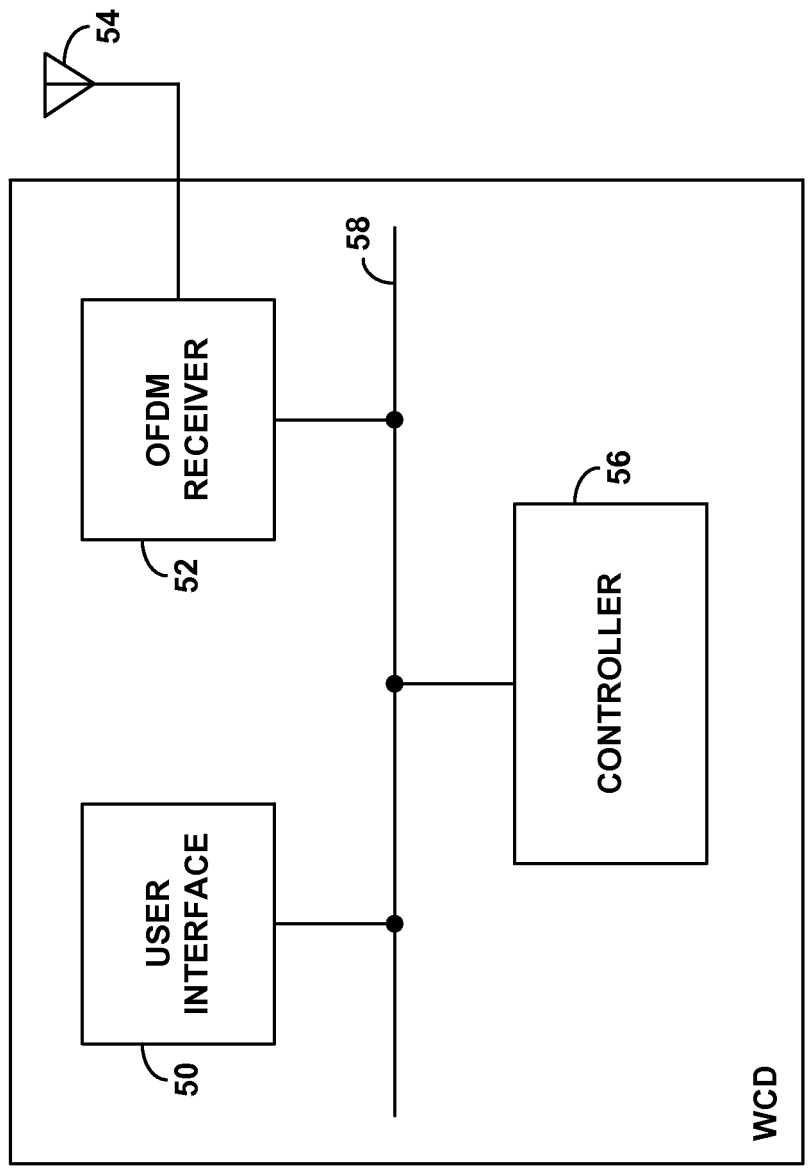
FIG. 5 is a simplified block diagram of an example WCD, in accordance with an example embodiment.

Finally, FIG. 5 is a simplified block diagram of an example WCD, showing some of the components of such a WCD to facilitate implementation of the present method. As shown in FIG. 5, the example WCD includes a user interface 50, an OFDM receiver (transceiver) 52 and an associated antenna structure 54, and a controller 56, with various ones of these or other components being communicatively linked together by a system bus, network, or other connection mechanism 58.

User interface 50 may include input and output components to facilitate interaction with a user if the WCD is a user-operable device. OFDM receiver 52 and antenna structure 54 may then function in combination to engage in OFDMA air interface communication with a cellular base station such as that described above. As such, the OFDM receiver 52 may be configured to receive OFDM communications on an air interface as described above, including for instance PDCCH communications and PDSCH communications. And controller 56, which may be integrated with OFDM receiver 52 or one or more other components, may control the processing of received communications, including control and user data.

In line with the discussion above, controller 56 may thus operate to detect in the downlink control channel of a given one of the sub-frames at least two DCI messages transmitted from the base station to the WCD, with each of the at least two DCI messages scheduling downlink communication of bearer data to the WCD in the downlink traffic channel of the given sub-frame, and at least one DCI message of the at least two DCI messages including an indication of presence, in the downlink control channel of the given sub-frame, of at least one other DCI message of the at least two DCI messages. Further, controller 56 may then use the indication in at least one DCI message of the at least two DCI messages as a basis to ensure receipt by the WCD of all of the at least two DCI messages transmitted to the WCD in the given sub-frame, as discussed above.

For instance, as discussed above, the at least two DCI messages may include (i) one DCI message that schedules downlink communication of bearer data to the WCD on just one carrier and (ii) another DCI message that schedules downlink communication of second bearer data to the WCD on multiple carriers. Pursuant to the one DCI, the controller may thus obtains the first bearer data from just the one carrier, and pursuant to the other DCI, the controller may obtain the second bearer data from the multiple carriers.

Exemplary embodiments have been described above. Those skilled in the art will understand, however, that changes and modifications may be made to these embodiments without departing from the true scope and spirit of the invention.

We claim:

1. A method comprising:
providing, by a cellular base station, a wireless coverage area defining an air interface, wherein the air interface defines downlink sub-frames each having a downlink control channel and each having a downlink traffic channel, and wherein the cellular base station transmits, in the downlink control channel of a given one of the sub-frames, Downlink Control Information (DCI) messages that schedule downlink communication of bearer data;

transmitting, by the cellular base station, in the downlink control channel of the given sub-frame, at least two such DCI messages to a particular wireless communication device (WCD) served by the cellular base station, wherein the cellular base station provides the WCD with multiple distinct bearers for carrying bearer data, wherein each DCI message of the at least two DCI messages schedules downlink communication to the WCD for a different respective one of the multiple distinct bearers, wherein the at least two DCI messages includes a first DCI message that schedules downlink communication of bearer data for a first one of the bearers and a second DCI message that schedules downlink communication of bearer data for a second one of the bearers;

and including, by the cellular base station, in at least one of the at least two transmitted DCI messages, an indication of presence, in the downlink control channel of the given sub-frame, of at least one other DCI message of the at least two DCI messages, whereby the indication included in at least one of the at least two transmitted DCI messages enables the WCD to ensure that the WCD receives all of the at least two DCIs transmitted to the WCD in the given sub-frame.

2. The method of claim 1, wherein each of the DCI messages that the cellular base station transmits in the downlink control channel of the given sub-frame schedules downlink communication of bearer data in the downlink traffic channel of the given sub-frame.

3. The method of claim 1, wherein the at least two DCI messages is two DCI messages, and wherein the indication in at least one DCI message of the two DCI messages indicates presence, in the downlink control channel of the given sub-frame, of the other DCI message of the two DCI messages.

4. The method of claim 3, wherein the indication comprises a Boolean flag that indicates presence, in the downlink control channel of the given sub-frame, of the other DCI message of the two DCI messages.

5. The method of claim 1, wherein the indication in the at least one DCI message of the at least two DCI messages indicates how many other DCI messages of the at least two DCI messages are present in the downlink control channel of the given sub-frame.

6. The method of claim 1, wherein each DCI message of the at least two DCI messages includes a cyclic redundancy check (CRC) masked with a cell radio network temporary identifier (C-RNTI) of the WCD.

7. The method of claim 1, wherein the cellular base station uses carrier aggregation to provide service on multiple carriers, and wherein a first one of the at least two DCI messages schedules downlink communication to the WCD on just one carrier of the multiple carriers, but a second one of the at least two DCI messages schedules downlink communication to the WCD on at least two carriers of the multiple carriers.

8. The method of claim 7, wherein the first DCI message schedules downlink communication of bearer data for one of the distinct bearers on just the one carrier, whereas the second DCI message schedules downlink communication of bearer data for another of the distinct bearers on the at least two carriers.

9. The method of claim 1, wherein the air interface is an Orthogonal Frequency Division Multiple Access (OFDMA) air interface.

10. A method comprising:
operating, by a wireless communication device (WCD), in a wireless coverage area served by a cellular base station, wherein the wireless coverage area defines an air interface, and wherein the air interface defines downlink sub-frames each having a downlink control channel and each having a downlink traffic channel;
wirelessly receiving, by the WCD from the cellular base station, in the downlink control channel of a given one of the sub-frames, at least two Downlink Control Information (DCI) messages transmitted from the cellular base station to the WCD, wherein each of the at least two DCI messages schedules downlink communication of bearer data to the WCD, wherein the WCD has at least two distinct bearers for communication of bearer data, wherein a first DCI message of the at least two DCI messages schedules downlink communication of bearer data for just a first bearer of the at least two bearers, and a second DCI message of the at least two DCI messages schedules downlink communication of bearer data for just a second bearer of the at least two bearers, and wherein at least one DCI message of the at least two DCI message includes an indication of presence, in the downlink control channel of the given sub-frame, of at least one other DCI message of the at least two DCI messages;
and using, by the WCD, the indication in at least one DCI message of the at least two DCI messages as a basis to ensure receipt by the WCD of all of the at least two DCI messages transmitted to the WCD in the given sub-frame.

11. The method of claim 10, wherein using by the WCD the indication in the at least one DCI message of the at least two DCI messages as a basis to ensure receipt by the WCD of all of the at least two DCI messages transmitted to the WCD in the given sub-frame comprises:
determining, by the WCD, based at least in part on the indication in the at least one DCI message of the at least two DCI messages, that there is at least another DCI message of the at least two DCI messages;
and responsive to the determining, searching for and obtaining from the downlink control channel at least the other DCI message of the at least two DCI messages.

12. The method of claim 10, wherein using by the WCD the indication in the at least one DCI messages of the at least two DCI messages as a basis to ensure receipt by the WCD of all of the at least two DCI messages transmitted to the WCD in the given sub-frame comprises:
determining, by the WCD, based at least in part on the indication in the at least one DCI message of the at least two DCI messages, that the WCD has received all of the at least two DCI messages.

13. The method of claim 12, further comprising:
based at least in part on the determining, transmitting from the WCD to the cellular base station a positive acknowledgement indicating receipt by the WCD of the bearer data communicated pursuant to the at least two DCI messages.

14. The method of claim 13, further comprising:
receiving, by the WCD, the bearer data communicated pursuant to the at least two DCI messages, wherein transmitting the positive acknowledgement is further based at least in part on the receiving of the bearer data communicated pursuant to the at least two DCI messages.

15. The method of claim 10, wherein the first DCI message schedules downlink transmission of bearer data to the WCD on just one carrier, and the second DCI message schedules downlink transmission of bearer data to the WCD on two or more carriers.

16. A wireless communication device (WCD) comprising:
a wireless communication interface for engaging in communication with a base station over an air interface, wherein the air interface defines downlink sub-frames each having a downlink control channel and each having a downlink traffic channel;
and a controller for processing communications that the wireless communication interface receives from the base station,
wherein the controller detects in the downlink control channel of a given one of the sub-frames at least two Downlink Control Information (DCI) messages transmitted from the base station to the WCD, wherein each of the at least two DCI messages schedules downlink communication of bearer data to the WCD in the downlink traffic channel of the given sub-frame, wherein each DCI message of the at least two DCI messages schedules downlink communication to the WCD for a different respective one of multiple distinct bearers established for the WCD, wherein the at least two DCI messages includes a first DCI message that schedules downlink communication of bearer data for a first one of the bearers and a second DCI message that schedules downlink communication of bearer data for a second one of the bearers, and wherein at least one DCI message of the at least two DCI messages includes an indication of presence, in the downlink control channel of the given sub-frame, of at least one other DCI message of the at least two DCI messages,
and wherein the controller uses the indication in at least one DCI message of the at least two DCI messages as a basis to ensure receipt by the WCD of all of the at least two DCI messages transmitted to the WCD in the given sub-frame.

17. The wireless communication device of claim 16, wherein the at least two DCI messages includes (i) a first DCI message that schedules downlink communication of first bearer data to the WCD on just one carrier and (ii) a second DCI message that schedules downlink communication of second bearer data to the WCD on multiple carriers, and
wherein, pursuant to the first DCI, the controller obtains the first bearer data from just the one carrier, and pursuant to the second DCI, the controller obtains the second bearer data from the multiple carriers.

* * * * *